3,660,407
PURIFICATION OF FLAVANTHRONE
YELLOW PIGMENT
James W. Kay, Riegelsville, and Robert E. Norwood, Easton, Pa., assignors to Pfizer Inc., New York, N.Y.
No Drawing. Filed June 2, 1969, Ser. No. 829,700
Int. Cl. C07d 39/00
U.S. Cl. 260—273   1 Claim

ABSTRACT OF THE DISCLOSURE

A process of purifying impure flavanthrone yellow pigment which utilizes extractants such as N,N'-dimethylacetamide, N,N'-dimethylformamide or dimethylsulfoxide.

BACKGROUND OF THE INVENTION

This invention is concerned with a process of purifying organic color pigments. In particular, it is concerned with a process of purification of impure flavanthrone yellow pigment.

Flavanthrone yellow pigment, also known as Vat Yellow No. 1, is generally prepared by the condensation of two moles of 2-aminoanthraquinone, or the condensation of two moles of 1-chloro-2-aminoanthraquinone. This reaction does not yield a 100% pure product and is adulterated with unreacted starting materials and other by-products of the reaction. These impurities must therefore be removed in order to obtain a grade of flavanthrone yellow pigment suitable for use as a color pigment. If these impurities are not removed, the flavanthrone yellow pigment has a dirty dull shade and exhibits a very undesirable and severe "bleed" in most common organic solvents and/or plasticizers, when the pigment is used to color paints, plastics, synthetic fibers such as acrylics and other materials.

Commonly used methods of purification in the manufacture of flavanthrone yellow include washing the impure flavanthrone yellow with a solvent such as hot water, nitrobenzene or sulfuric acid solutions. In some instances the flavanthrone yellow is dissolved in sulfuric acid and recrystallized as a means of purification. Reduction of flavanthrone yellow to its water soluble leuco form, with subsequent recrystallization is also used.

While one or more of the aforementioned purification techniques, when used alone or together, gives a finished product, satisfactory for many purposes, the process is generally long and the product is not in fact of the highest quality. Many times the loss of a portion of the flavanthrone yellow during processing is so great that the purification becomes impractical.

The impure pigment may contain from about 34% to about 88% flavanthrone yellow pigment, depending on the particular method of preparation used. These impure pigments are then subjected to the various purification procedures to produce a commercial pigment of from about 94 to about 98% purity. They also contain from 2–6% impurities or diluents.

SUMMARY OF THE INVENTION

In accordance with the present invention, a process is provided which comprises contacting impure flavanthrone yellow with an agent selected from the group consisting of N,N'-dimethylacetamide, N,N'-dimethylformamide and dimethylsulfoxide whereby a truly superior pigment of the highest quality is obtained.

DETAILED DESCRIPTION OF THE INVENTION

Many solvents were evaluated as extraction solvents for the removal of the impurities, thus enabling the production of pure flavanthrone yellow pigment. However, it was determined that aprotic solvents such as N,N'-dimethylacetamide, N,N'-dimethylformamide and dimethylsulfoxide are superior to the others tested. The impurities, which include 2-aminoanthraquinone, and anthraquinone, are readily soluble in these solvents, while the flavanthrone yellow pigment is essentially insoluble, thus permitting separation of the desired product from the impurities. Due to the high degree of solubility of the impurities in these solvents, the amount of time per extraction of the impurities is greatly reduced.

The extraction temperature employed in the new process is not critical. Of course, purification can be accomplished more quickly at elevated temperatures; up to the boiling point of the extracting solvent, however, extraction at room temperature is also effective.

While any practical method of contacting the impure flavanthrone yellow pigment with the selected solvent will accomplish the extraction, it has been found that the most efficient method is the use of a continuous extraction apparatus, i.e., a Soxhlet extractor or one where redistilled hot solvent is continuously passing through the material to be extracted. Other suitable methods include slurrying the impure pigment in the solvent followed by filtration, centrifugation or decantation to remove the solvent. The pigment is then washed with methanol or water and tray dried at 65–75° C., to remove residual moisture and milled to the desired particle size.

The time required to complete the purification is best determined by experiment since it will vary with the extraction temperature and other variables, such as the size and type of continuous extractor used. For example, purification using N,N'-dimethylacetamide as the extracting solvent in a pilot plant model bituminous extractor supplied by A. H. Thomas & Co. is accomplished after refluxing for about two to three hours. Comparable results are obtained using large scale production equipment in which batches of 50 to 150 lbs. can be purified, in about three to six hours.

The relative proportion of solvent employed is not critical, since the impurities commonly encountered are highly soluble in the solvents specified. Naturally, the volume employed must be sufficient to permit ready separation of the solvent from the purified pigment, i.e., must not be so small as to merely moisten the pigment. A ratio of from about 2–10 lbs. of solvent to about 1 lb. of pigment is usually required.

The greater efficiency of this process over the conventional processing is illustrated by comparing the yields obtained: 65–68% for the conventional process versus 82–83% for the new process.

Flavanthrone yellow pigment produced by this method is greater than 99% pure and shows superior properties with regard to shade of yellow, high transparency and a much higher color tint strength as compared to pigments produced by conventional methods. Pigment prepared by this process also shows much superior light fastness qualities when exposed to artificial light and weathering in various media.

Paint samples using pigment produced by this new process showed excellent weathering characteristics when subjected to exposure at 45° south, in Miami, Florida. Exposure under these conditions is in a sense an accelerated test since these are extremely severe conditions and is considered as a general test in the evaluation of paints.

The following example is provided by way of illustration and should not be interpreted as limiting the invention, many variations of which are possible without departing from the spirit or scope thereof.

EXAMPLE I

The following table illustrates the effectiveness, as measured by the percent impurities removed, of various agents used as extracting solvents. All tests are run in a Soxhlet extractor, with the solvents at reflux throughout the test period.

| | Volume of solvent, ml. | Weight of crude flavanthrone yellow, gm. | Weight of same after extraction, gm. | Percent impurities removal | Hours at reflux |
|---|---|---|---|---|---|
| Dimethylacetamide | 300 | 10.0004 | 8.3104 | 16.90 | 8 |
| Dimethylformamide | 300 | 10.0000 | 8.4891 | 15.11 | 8 |
| Dimethylsulfoxide | 300 | 10.0000 | 8.6286 | 13.71 | 8 |
| Methanol/acetone [50/50] | 300 | 10.0000 | 8.5250 | 14.75 | 24 |
| Methanol/methyl-ethyl ketone [50/50] | 300 | 10.0000 | 8.4251 | 14.65 | 24 |
| Methyl-ethyl ketone | 300 | 10.0000 | 8.4248 | 14.65 | 24 |
| Nitro-benzene | 300 | 10.0029 | 8.7517 | 12.51 | 24 |
| Acetone | 300 | 10.0000 | 8.8656 | 11.34 | 24 |
| Methyl-alcohol | 300 | 10.0000 | 9.3923 | 6.08 | 24 |

The above results clearly indicate the savings in extraction time when N,N'-dimethylacetamide, N,N'-dimethylformamide, and dimethylsulfoxide are used as extracting solvents.

What is claimed is:

1. In the process of purifying flavanthrone yellow pigment prepared by the condensation of 2-aminoanthraquinone or 1-chloro-2 aminoanthraquinone wherein the pigment is contacted with a solvent to remove impurities remaining from the condensation reaction, the improvement which comprises contacting the pigment with N,N'-dimethylacetamide as the solvent and thereafter separating the purified pigment from the solvent.

References Cited

UNITED STATES PATENTS

| | | | |
|---|---|---|---|
| 1,952,678 | 3/1934 | Kunz | 260—273 X |
| 2,468,599 | 4/1949 | Lecher | 260—273 |
| 3,259,514 | 7/1966 | Wilkinson | 106—288 Q |
| 3,264,298 | 8/1966 | Berry | 260—279 |
| 3,372,163 | 3/1968 | Tessandori | 260—279 |
| 2,857,400 | 10/1958 | Cooper | 260—279 |

DONALD G. DAUS, Primary Examiner

U.S. Cl. X.R.

106—288 O